United States Patent [19]
Reisner

[11] 4,210,280
[45] Jul. 1, 1980

[54] TRACTION MAT

[76] Inventor: Robert J. Reisner, 1624 N. Kilbourn Ave., Chicago, Ill. 60639

[21] Appl. No.: 935,975

[22] Filed: Aug. 22, 1978

Related U.S. Application Data

[63] Continuation-in-part of Ser. No. 912,053, Jun. 2, 1978, abandoned, which is a continuation-in-part of Ser. No. 900,565, Apr. 27, 1978, abandoned.

[51] Int. Cl.² .............................................. E01B 23/00
[52] U.S. Cl. ...................................................... 238/14
[58] Field of Search ......................... 238/14; 180/7 R; 152/208, 213 R, 213 A

[56]         References Cited
        U.S. PATENT DOCUMENTS

| | | | |
|---|---|---|---|
| 1,533,679 | 4/1925 | Webster | 152/208 |
| 1,863,316 | 6/1932 | Webster, Jr. | 238/14 |
| 3,335,776 | 8/1967 | Peterson | 152/208 X |
| 3,701,474 | 10/1972 | Welz | 238/14 |
| 3,708,117 | 1/1973 | Coale | 238/14 |
| 3,797,549 | 3/1974 | Lieberum | 238/14 X |

FOREIGN PATENT DOCUMENTS 2601662  7/1977  Fed. Rep. of Germany.

*Primary Examiner*—Randolph A. Reese
*Attorney, Agent, or Firm*—Robert E. Wagner; Gerald T. Shekleton

[57]                ABSTRACT

A traction mat having a plurality of pins captivated in a resilient mat, each pin having a head on each of the opposing ends, and a washer between the head and the mat. The mat provides increased traction to a vehicle stuck in snow and the like by seizing both the tire and the ground with the heads of each pin in pivotal action, as the washer pivots and locks the heads in a gripping position for the increased traction. A rigid steel start plate of a width less than the width of the tire is attached to one end of the mat for providing initial impetus to position the mat under the tire.

17 Claims, 18 Drawing Figures

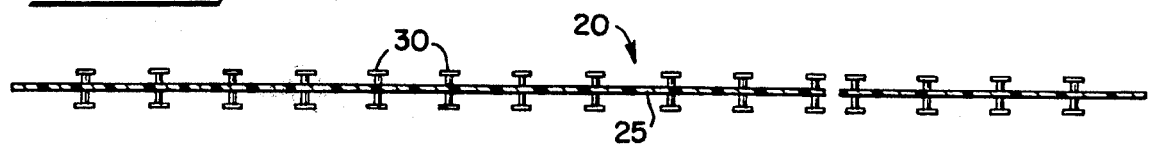
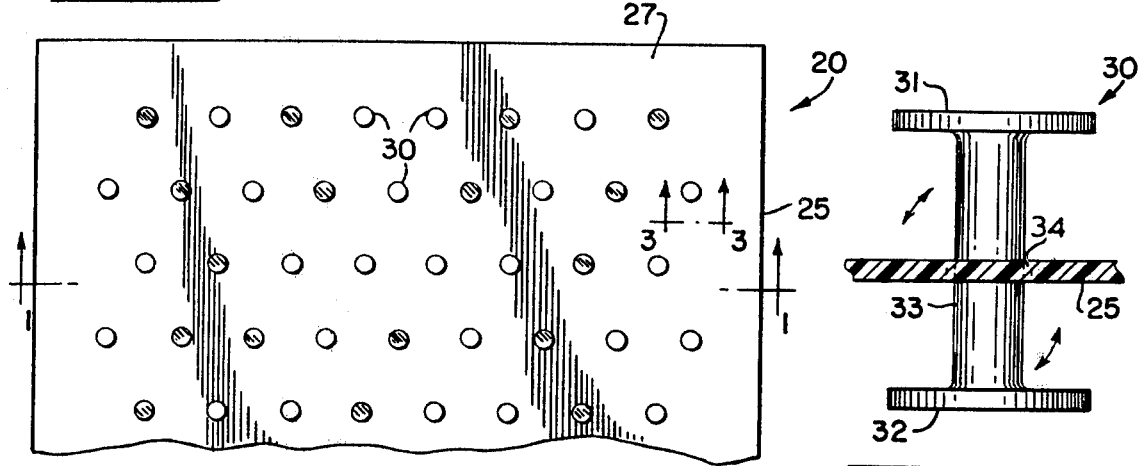
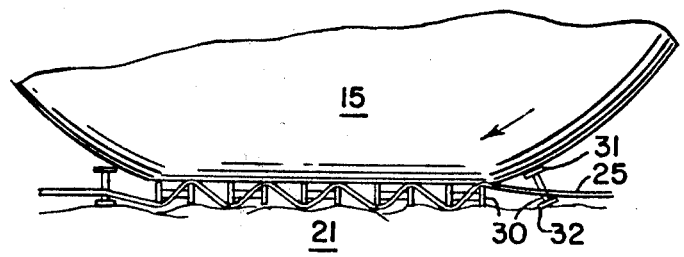
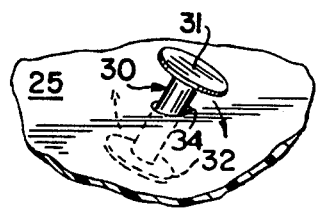
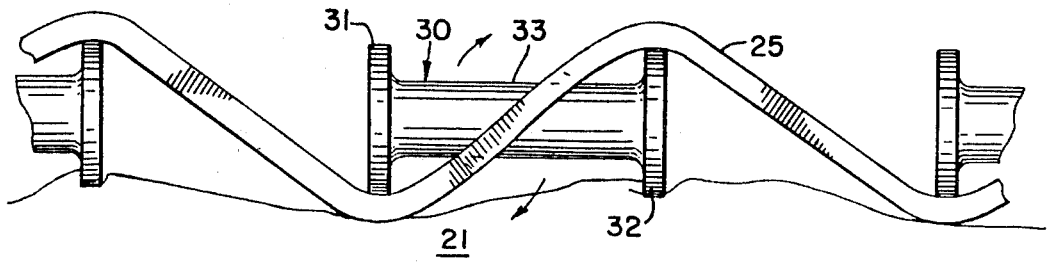

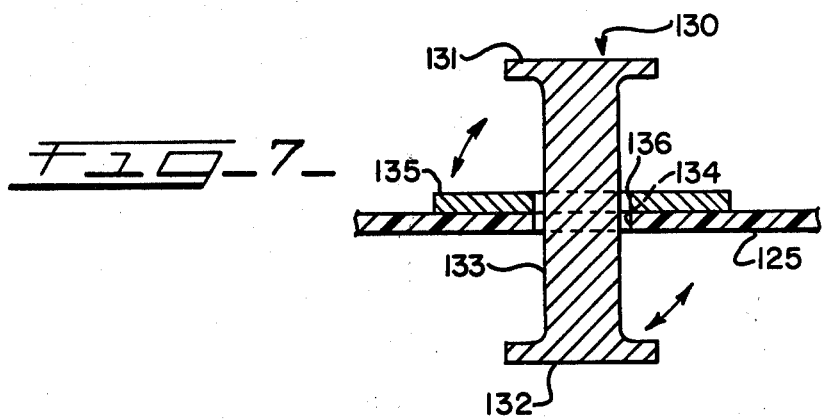
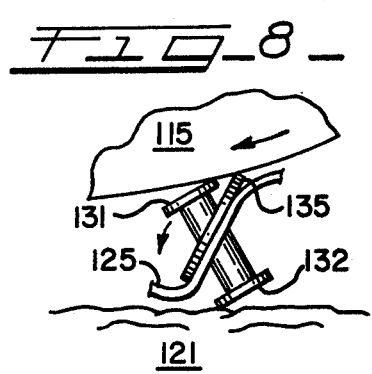
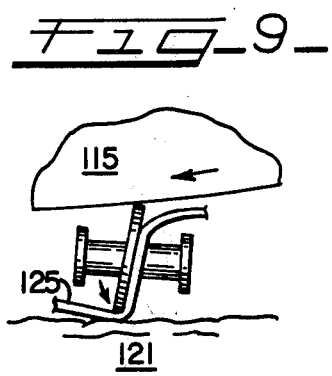
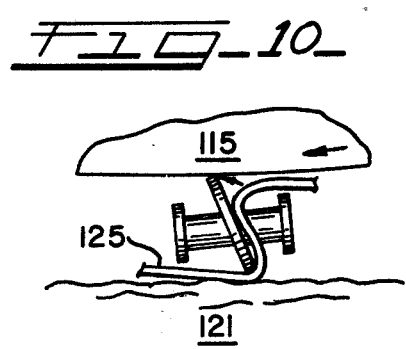
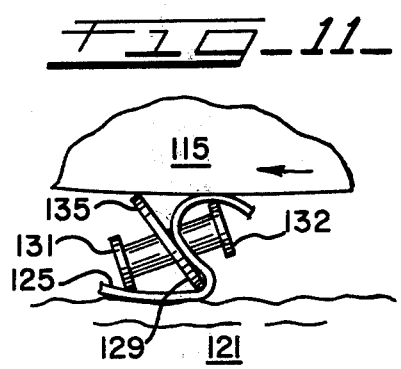
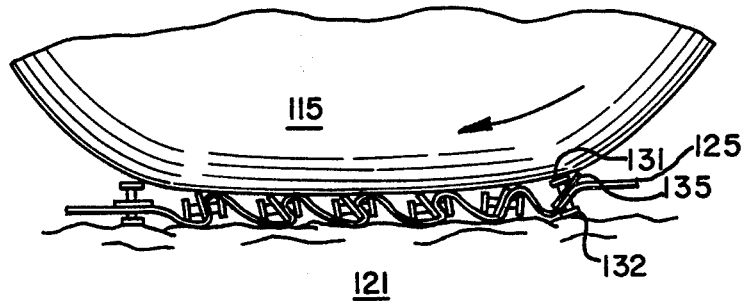

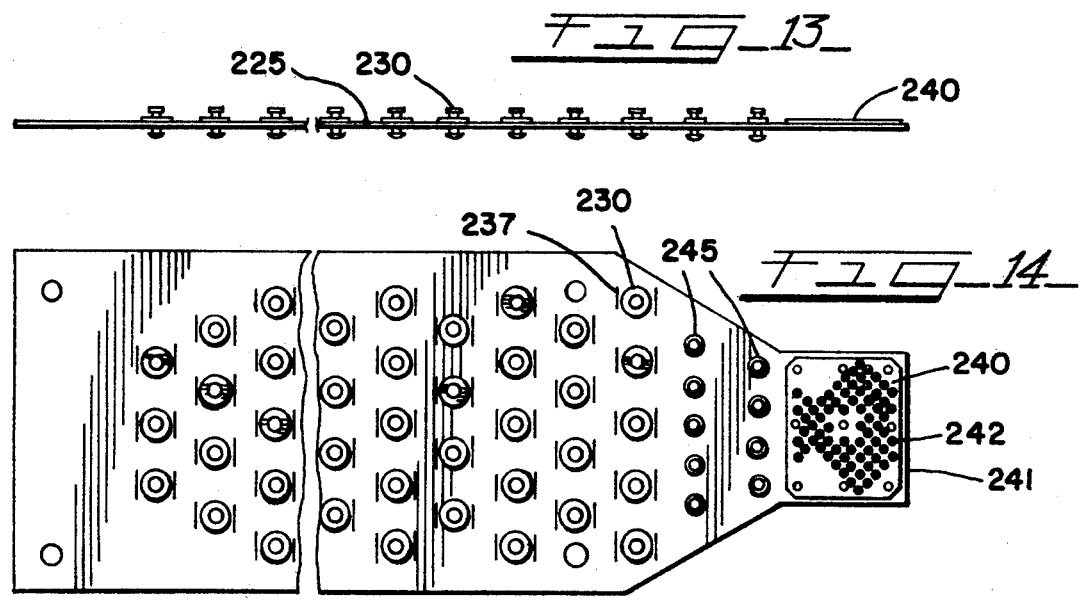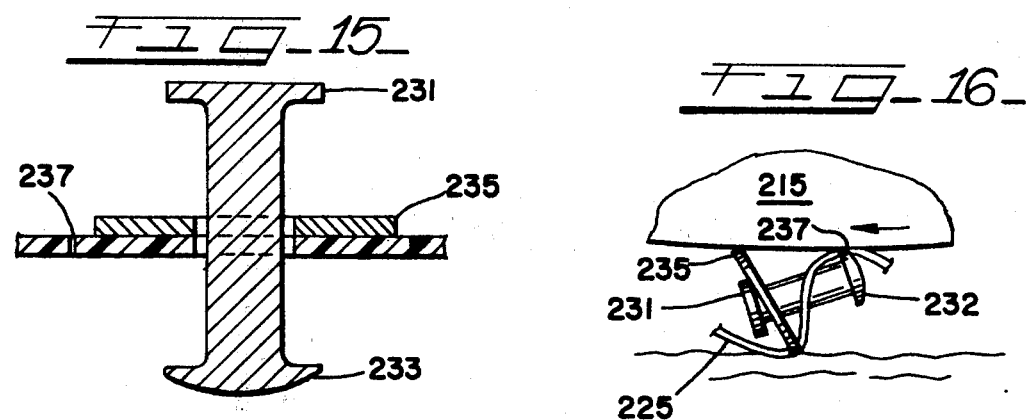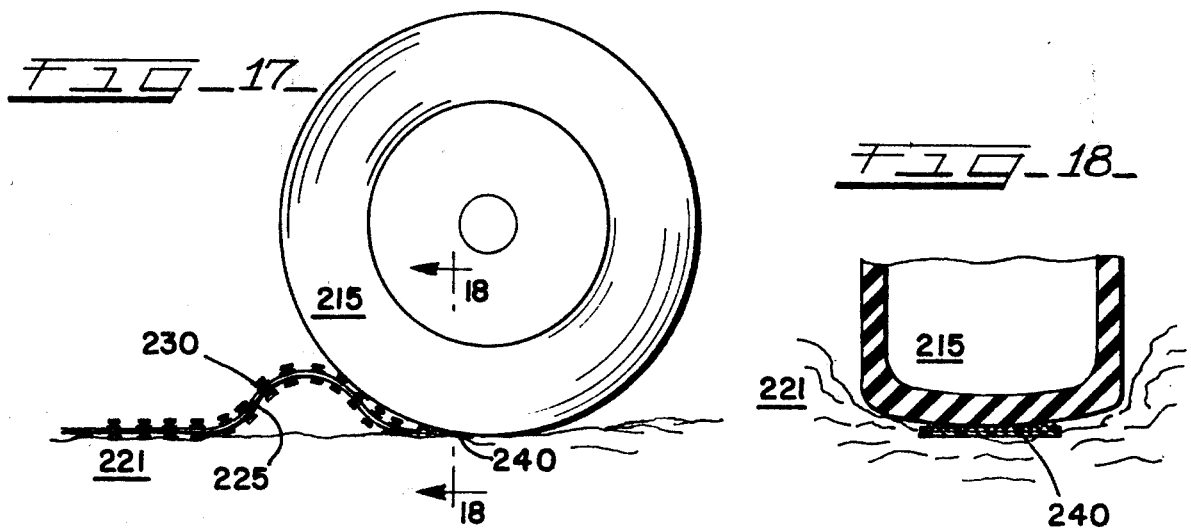

TRACTION MAT

The present application is a continuation-in-part of my earlier filed application, Ser. No. 912,053, filed June 2, 1978 abandoned, which is a continuation-in-part of Ser. No. 900,565 filed Apr. 27, 1978, abandoned.

BACKGROUND OF THE INVENTION

This invention relates in general to traction devices and, in particular, to improved traction mats for automobiles, trucks and the like in the extrication of such vehicles from ice, snow, sand, mud or the like.

Traction mats have been used by automobile vehicles for many years to enable the vehicle to be driven out of a rut or pothole by gaining additional traction from materials placed into the path of the drive wheel. Numerous such means have been used by persons stuck in ice or snow, including sand, ashes, boards, burlap bags, pieces of carpeting, tire chains, expanded metal and the like. Such makeshift means are generally ineffective, being immediately caught and thrown out by the rotating traction wheels, subjecting bystanders to possible injury from the flying objects. In addition, the prior art is replete with mats having indentations in their surface, mats formed of various materials, including sheet metal with openings or indentations formed therein, and, in some cases, studs have been fastened to the mat. Such devices of the prior art have proven unsatisfactory for numerous reasons, including being overly expensive to manufacture, unsafe to handle because of sharp edges, etc., snow or mud being packed between the protuberances on the mat causing loss of traction, and various other reasons.

SUMMARY OF THE INVENTION

It is therefore an object of the subject invention to provide a traction mat which has improved traction capability.

A further object of the subject invention is to provide a portable traction mat which may be easily and safely carried without fear of injury and stored in a safe and inobtrusive manner.

A still further object of the subject invention is an improved traction mat which may be manufactured easily without expensive tooling and with inexpensive, readily available components.

Yet another object of the subject invention is an improved traction mat which is formed of rivets in a resilient mat, each rivet being freely engaged with the mat so as to allow a pivotal action of the rivet with respect to the mat.

Another object of the subject invention is an improved traction mat which has a rigid starter plate of a size less than the tire size for easy movement onto the mat.

These and other objects are obtained in accordance with the present invention wherein there is an improved traction mat having a plurality of pins or other projections inserted in a flexible sheet or mat. Each pin or projection has a head on opposing ends and is spaced at least a certain minimal distance from an adjacent pin to form a matrix when considered as a whole. In a preferred embodiment of the invention, the pin is loosely engaged with the flexible sheet so as to float freely with respect to the sheet itself, being retained on the sheet by the respective heads of the pin. When in use, each pin will pivot about its axis in a three-dimensional plane. The head of each pin on the upper side will individually grip the rotating tire, pivot accordingly, and cause the head on the opposite side of the same pin to also pivot, dig in, and hold the surface from which the vehicle is to be extricated. Thus, each pin becomes an independently-acting, traction-engaging device, and, in the aggregate, yield a superior means of improving traction on normally slippery surfaces. A secondary tire-engaging means freely engaged with the pin, such as a washer for providing a second pivot point, and accepting the forces of the tire may be used for even greater traction. A rigid starter plate is attached to one end of the mat and is of a size less than the width of the tire which is struck and spinning. This starter plate allows the tire to engage the mat and push it under thereby causing the pins to dig in and engage the mud or the like for traction.

DESCRIPTION OF THE DRAWINGS

Further objects of the invention, together with additional features contributing thereto and advantages accruing therefrom, will be apparent from the following description of one embodiment of the invention when read in conjunction with the accompanying drawings, wherein:

FIG. 1 is a cross section of the improved traction mat taken along lines 1—1 of FIG. 2;

FIG. 2 is a top plan view of one form of improved traction mat;

FIG. 3 is a cross-sectional view of one embodiment of a pin used in the subject invention taken along the lines 3—3;

FIG. 4 is a side elevational view of the improved traction mat of the subject invention, showing the pins pivoting under a rotating wheel to provide increased traction;

FIG. 5 is an enlarged elevational view showing the detail of the movement of the pins under a rotating vehicle wheel;

FIG. 6 is a top plan view of an individual pin rotating in a lateral mode;

FIG. 7 is a side cross-sectional view of a second embodiment of a pin used with a washer in the subject invention; FIGS. 8–11 are a series of side plan views of a pin and washer showing the washer acting as a secondary pivot point;

FIG. 12 is a side elevational view of the improved traction mat of FIGS. 7-10, showing the pins and washers pivoting under a rotating wheel to provide increased traction;

FIG. 13 is a side view of another embodiment of the traction mat of the subject invention;

FIG. 14 is a top plan view of the embodiment of the subject invention shown in FIG. 13;

FIG. 15 is a cross-sectional view of one pin of the improved traction mat of FIGS. 13 and 14;

FIG. 16 is a side view of the pin of FIG. 15 when under a torsional load;

FIG. 17 is a side plan view of the subject invention showing placement of the starter plate under the tire; and, FIG. 18 is a cross-section taken along the lines 18—18 of FIG. 17 showing the relative sizes of the starter plate and tire.

Referring now to FIG. 1, there is shown a traction mat 20 of the subject invention comprising a thin sheet 25 of flexible material with a plurality of rigid projections such as pins 30 mounted within the sheet or mat 25 and a margin or border 27 about the pins 30.

In a preferred embodiment, pins approximately 9/16 of an inch in length with circular heads approximately 7/16 of an inch in diameter and a cylindrical stem portion approximately ¼ of an inch in diameter, are engaged in segments of approximately ⅛ of an inch thick mat which are 1 foot by 3 feet. These segments may be used in tandem or side-by-side as desired. The mat may comprise neoprene or other like material. In addition, the material may be reinforced with nylon or other flexible material, and may be a multi-ply material. The pins are spaced approximately 1½ inches apart in a matrix where alternate rows are aligned and adjacent rows are offset. A one inch border about the periphery of the mat allows easy handling.

FIG. 3 depicts an individual rigid projection or pin 30 which may be a rivet of hard plastic, steel or the like, having a stem portion 33 and heads 31 and 32, respectively, on opposing ends. The head may be circular, with a diameter at least one-half the length of the pin 30. The pins are placed in a flexible mat 25, a certain minimal distance between one another of one pin length, for reasons which shall become apparent. Each pin may be secured in holes or openings 34 in the mat in a loose fashion to allow freedom of movement of the pin 30 relative to the mat 25. The openings 34 are exaggerated in size for better illustration. While the pin 30 is loosely engaged within the opening 34, the walls of the opening 34 may frictionally engage the pin 30 to hold it stationary. Thus, when not in use, the mat assembly 20 will appear as in FIG. 1 with pins at different heights relative to the sheet 25. Due to the flexibility of the mat and the looseness of the engagement of the pin 30 with the mat 25, the pin may pivot on any desired axis to become a floating hinge. As the pin is completely responsive to the forces prevailing against it, an individual pin may rotate 360° in a circuular lateral mode substantially in the plane of the mat 25, as shown in FIG. 6, or 180° in a vertical mode perpendicular to the plane of the mat, as shown in FIG. 2. Thus, each pin 30 is pivotal to a position where each of said ends is either touching or adjacent the surface of said mat or sheet 25. Of course, the pin may be fixedly secured to the mat, thereby restricting any pivotal movement to one axis of rotation.

As shown in FIG. 4, under the pressure of a rotating tire 15, each individual pin may pivot independently of the other, as the rotating tire 15 contacts the head 31 of an individual pin 30, it will push the head in the direction of the rotation of the tire, causing a corresponding pivotal movement of the pin 30 and therefore opposite, but equal movement of the head 32 of that pin 30. This pivotal movement of the pin 30 forces it into a working position causing it to grip a hard surface such as ice, or act as a drag scoop in soft terrain, such as mud or wet snow.

Each individual pin 30 in contact with the rotating tire is thus pivoting about its own axis and independently biting into the surface 21 from which traction is wished to be gained. Because of the flexibility of the mat 25, should one be on extremely soft terrain, such as mud, the mat may wrap itself about the tire as the tire and mat sink into the mud under the weight of the vehicle. With the free-floating pin as described above, each pin will interact with the mud to the extent that the pressure is applied to that pin. Thus, where the weight on the traction mat is the greatest, i.e., directly underneath the tire, that is where the most traction will be derived. Hence, the pin will be pushed substantially flat against the tire-engaging surface of the mat, for maximum traction of the mat with the ground surface. However, a relatively large length of the pin 30 will be directed against the sides of the tire where the tire does not exert much weight or pressure against the pins. The pins 30 in that area will pivot on movement of the tire, grabbing the treads or the side of the tire. Since the mat is anchored securely to the ground surface by the pins directly beneath the tire, the traction mat 20 will grab the tire on the sides and also grab the loose ground surface directly underneath the tire to gain the needed traction to extricate the vehicle.

In one embodiment of the invention, elevated areas may be molded integrally into the flexible mat 25, centered on each pin 30. These elevated areas may take any form, such as circular, and have a minimal diameter of the length of the pin body 33. This elevation will serve to strengthen the flexible mat at the points of contact with the pin 30 and will aid in preventing puncturing of the mat 25 by either head 31 or 32 of the pin 30.

In FIG. 7 a second embodiment is shown having a pin assembly 130 with an upper head 131, a lower head 132, and a stem portion 133 loosely inserted in opening 134 of mat 125. A washer or washer-like object 135 with a central opening 136 is placed on one or both sides of the mat, adjacent the mat and loosely encompassing the pin stem portion 133.

FIGS. 8-11 depict the sequential movement of the pin and show the pivotal motion of the pin on the rotation of the tire 115. In this movement of the pin assembly the washer 135 is seen to pivot independently of the pin. At the midpoint in the rotation of the pin (FIGS. 9-10) the washer 135 contacts the wheel and assumes the total force of the wheel on the pins. The washer 135 is now the source of added traction, providing a larger surface for contact with the ground or snow. As the wheel continues to rotate, the washer 135 now pivots from the position of FIG. 9 to that of FIG. 10 under the force of the wheel, providing a second pivotal means for increased traction. When the position shown in FIG. 11 is reached, two areas of the pin assembly are available for contact or engagement with the ground, the washer edge 129, and the upper pin head 131 while two areas of the pin assembly are also in contact, or at least engaged with the tire; the peripheral edge 129 of the washer and the lower head 132 of the pin. In such a position (FIG. 10) the washer 135 locks the pin in the traction position which provides for maximum contact with both the ground and the tire. Thus not only does the washer 135 contribute to a double pivoting action of the pin assembly, but it also comprises a floating lock which locks the pin in the maximum traction position. It is the floating washer in combination with the floating pin which affords such great traction.

To provide a maximum double-pivoting action, the opening 136 of the washer 135 should be of an interior diameter larger than the outside diameter of the pin stem portion 133. The outside diameter of the washer should be larger than that of the pin heads 131 and 132. In the preferred embodiment, the washer 135 is ¾ of an inch in diameter with a 5/16 of an inch central opening, which accepts a rivet or pin of slightly less than 9/16 of an inch length, and a stem portion of approximately ¼ of an inch diameter with flat heads of approximately 7/16 of an inch diameter.

In another embodiment of the subject invention, the traction mat of the subject invention may have one head of the pin embedded in the mat, being sandwiched by a second ply of the resilient mat, or, anchored by cementitious material. In this manner, the pin will still pivot in response to the action of the wheel on it as a result of the mat's flexibility, and thus the pin will still be effective in improving the traction of the wheels.

In yet another embodiment of the subject invention, slits may be cut in the resilient sheet about the pins as shown in FIGS. 14-16. As shown in FIG. 14, slits 237 are placed on opposite sides of each full-size pin 230 and spaced a sufficient distance from the pin so that upon the pivotal action of the pin 230, the head 231 and 232 or the edge of the washer 235, if used, will contact the sheet at only two points of wear as shown in FIG. 16. By such limited contact with the slit, the sheet will not encounter excessive wear through the use of the traction mat. As the bulk of the pin contact with the sheet will occur in the direction of travel of the vehicle, it is preferable that the slits be placed about the pin perpendicular to the longitudinal axis of the traction mat.

In a further embodiment of the subject invention, a starter plate is fixedly mounted to one end of the traction mat of the subject invention, as shown in FIGS. 13-17. This starter plate portion may comprise a steel plate 240 attached by rivets or other appropriate permanent manner to one end of the traction mat. The steel plate may have raised perforations, gratings or the like for increasing traction on its upper surface. The leading edge of the mat 241 to which the steel plate 240 is attached, is smooth on its underside. Thus, when in use, the steel plate 240 will, by reason of its rough upper surface, be seized by the tire 215 and slip on its smooth underside to bring the mat body under the tire where its gripping action may effectuate the release of the vehicle from its stuck position. As shown in FIG. 14, a few rows of slightly smaller rivets may be placed between the larger rivets and the starter plate to ease the movement of the vehicle wheel onto the traction mat. For larger tires as on heavy construction vehicles and the like, two steel plates may be placed in tandem separated by a portion of the flexible mat. This will insure that the starter plate portion will be under the tire at the point where the weight of the vehicle is greatest.

If in practice, then, the embodiment of the subject invention shown in FIGS. 13-16 is best shown by reference to FIG. 17. When a vehicle is stuck in the snow or mud, the traction mat of the subject invention is utilized to extricate the vehicle from this mixed condition by jamming the steel start plate 240 underneath the tire 215 as far as possible, leaving a small loop of the mat in close proximity to the tire 215. The wheel is caused to spin, although at a much slower speed than before use of the mat, causing the starter plate to be seized by the tire and dragged underneath. This is accomplished by the slipping of the smooth underside of the starter plate on the terrain while the grated top surface 242 of the starter plate grips the tire. Acceleration is continued whereby the tire moves to the first tier of small grippers 245 on the traction mat and from there to the larger size grippers 230 and out of the rut in which the vehicle is stuck. This starting procedure needs no outside force other than the starting plate 240 itself and the spinning wheel to bring the main body of the mat into its proper working position.

It is important to note that the width of the entire starting area of the mat, including the starter plate 240 and the leading edge of the traction mat 241, preferably should not protrude out beyond the tire tread. The width of the starting area of the traction mat of the subject invention, i.e., the width of the starting plate and the leading edge of the traction mat combined, is preferably no larger than the tread width of the vehicle tire with which it is to be used. The smallest widely commercially available tire for use with automotive vehicles is generally recognized as having a tread width of five inches. Therefore, the starting plate area, as currently embodied in the subject invention, has a width of four inches. The starting plate area may remain the same regardless of the other dimensions of the traction mat as manufactured for use with larger cars or trucks. It is believed that the reason for the success of this embodiment is that because the starter plate area is smaller than the tread width of the car, maximum initial contact may be made with the tire tread at the point where the force of the tire opposite the mat will be the greatest. A starter plate of such a size may be shoved in farther for more tire contact directly underneath the tire, where the force is greatest and still maintain its flat posture. Were the starter plate 240 the same size as the remainder of the traction mat, the starter plate could not be placed completely in the rut created by the spinning tire and under the tire. If the flexible sheet 225 of the traction mat overlapped the starter plate 240 on either side, then the traction mat could not be shoved in far enough under the tire for the tire to initially efficiently seize the starter plate.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A traction mat assembly for obtaining increased traction for an automotive vehicle wheel on a ground surface, said traction mat comprising a substantially uniformly thick resilient sheet having a plurality of spaced openings, a plurality of pin assemblies, each comprising a pin loosely captivated in an opening having a stem portion and opposing ends, each of said opposing ends extending beyond a surface of said sheet, said pin being movable into and out of the plane of said sheet and pivotable about a point in the plane of said sheet to a position where one of said opposing ends is proximate to said surface of said traction mat assembly, said pin thereby engaging both said wheel of said vehicle with which it may be in contact and the ground surface underneath said traction mat, each of said pin assemblies pivoting independently of the others, and the collective action of said pin assemblies within said traction mat assembly being sufficient to provide increased traction of said wheel with respect to the ground.

2. The traction mat of claim 1 wherein each of said opposing ends has heads of larger diameter than said stem portion.

3. The traction mat of claim 2 wherein said heads of said pins have a maximum diameter at least one-half the length of said stem portion.

4. The traction mat of claim 2 wherein said heads comprise a first head on one pin end and a second head on an opposing pin end, said first head for contact with the ground surface.

5. The traction mat of claim 1 wherein each pin comprises a rivet.

6. The traction mat of claim 1 wherein slits in said resilient sheet are disposed about said pin.

7. The traction mat of claim 1 wherein a flat rigid plate is mounted to one end of said sheet.

8. The traction mat of claim 7 wherein said flat rigid plate is mounted on a leading edge of said resilient sheet, said leading edge and said flat rigid plate being of a combined width no larger than the tire tread of any vehicle with which it is to be used.

9. A traction mat assembly for obtaining increased traction for an automotive vehicle wheel on a slippery ground surface, said traction mat comprising a substantially uniformly thick resilient plastic sheet, a plurality of rivets, each rivet having opposing heads, a plurality of washers, each washer being adjacent said sheet and having a central opening for accepting one of said rivets, each of said rivets being loosely captivated in said sheet, said washer being loosely captivated by said rivet and said sheet, at least one of said heads of a rivet being positionable a sufficient distance from said sheet to be capable of pivoting said rivet upon contact with a wheel of said automotive vehicle, said washer being capable of freely pivoting upon contact with the wheel, and said washer and one of said heads of said rivet being extendable a sufficient distance from said sheet to be capable of engaging with said ground surface upon the pivotal motion for increased traction.

10. The traction mat assembly of claim 9 wherein slits are located in said sheet about each of said rivets, said slits being capable of accepting an edge of said washer on said pivotal motion.

11. The traction mat assembly of claim 9 wherein a flat rigid plate is mounted to a leading edge of said sheet, said flat rigid plate and said leading edge being of a width no greater than the tread width of the tire of any vehicle with which it is to be used.

12. A traction mat assembly for obtaining increased traction for an automotive vehicle wheel on a ground surface, said traction mat comprising a substantially uniformly thick resilient sheet having a plurality of spaced openings, a plurality of pin assemblies, each of said pin assemblies comprising a pin mounted in an opening having a stem portion and opposing ends, said opposing ends of said pins each extending beyond a surface of said sheet, a ground and tire-engaging means being pivotable to a position about a point in the plane of said sheet where one of said opposing ends is proximate to said surface of said traction mat assembly, both of said pin and said ground and tire-engaging means thereby applying an effective force to both said wheel of said vehicle with which it may be in contact and the ground surface underneath said traction mat, each of said pin assemblies pivoting independently of the others, and the collective action of said pin assemblies within said traction mat assembly being sufficient to provide increased traction of said wheel with respect to the ground.

13. The traction mat of claim 12 wherein each of said ground and tire-engaging means is a washer.

14. The traction mat of claim 12 wherein each of said ground and tire-engaging means have a maximum effective diameter greater than the maximum effective diameter of said opposing ends of each of said pins.

15. The traction mat of claim 12 wherein said pin assembly is loosely captivated in said sheet, allowing movement and pivotal action of said pin assembly about said sheet.

16. The traction mat of claim 12 wherein a flat rigid plate is mounted to a leading edge of said sheet.

17. A traction mat assembly for obtaining increased traction for an automotive vehicle wheel on a ground surface, said traction mat comprising a substantially uniformly thick resilient sheet having a plurality of spaced openings, a plurality of pin assemblies, each comprising a pin loosely captivated in an opening having a stem portion and opposing ends, extending beyond a surface of said sheet, said pin being movable into and out of the plane of said sheet and pivotable about a point in the plane of said sheet to a position where one of said opposing ends is proximate to said surface of said traction mat assembly, slits in said sheet about each of said openings a head of said pin being partially insertable through an adjacent slit in its pivotable movement for direct and positive engagement with both the wheel of said vehicle contacting said traction mat and the ground surface underneath said traction mat, each of said pin assemblies pivoting independently of the others, and the collective action of said pin assemblies within said traction mat assembly being sufficient to provide increased traction of said wheel with respect to the ground.

* * * * *